United States Patent [19]

Kubo

[11] 4,437,920
[45] Mar. 20, 1984

[54] APPARATUS FOR PRODUCT TRANSPORTATION IN TIRE-FORMING MACHINE

[75] Inventor: Masayoshi Kubo, Nagasaki, Japan

[73] Assignee: Mitsubishi Jukogyo Kabushiki Kaisha, Nagasaki, Japan

[21] Appl. No.: 368,856

[22] Filed: Apr. 15, 1982

[30] Foreign Application Priority Data

Apr. 20, 1981 [JP] Japan .................................. 56-59518

[51] Int. Cl.³ ...................... B60C 17/10; B60C 17/37
[52] U.S. Cl. ................................. 156/406.2; 156/420; 156/126; 156/128.1
[58] Field of Search .................. 156/394, 405.1, 406.2, 156/417–420, 128.1, 123 R, 126, 127, DIG. 909

[56] References Cited

U.S. PATENT DOCUMENTS 3,865,669  2/1975  Todd ................................ 156/406.2
4,105,486  8/1978  Cantarutti ........................... 156/126

FOREIGN PATENT DOCUMENTS 7612385  5/1977  Netherlands .

*Primary Examiner*—Lois E. Boland
*Attorney, Agent, or Firm*—Wyatt, Gerber, Shoup, Scobey & Badie

[57] ABSTRACT

An apparatus for tire transportation in a tire-forming machine is described. The apparatus comprises a pair of circular plates attached to transfer means adapted to move in the axial direction of a tire-forming drum. A plurality of rotatable shafts are provided at substantially equal intervals in the circumferential direction on said circular plates and positioned on a circle concentric with said circular plates. To these shafts are attached levers having holding members for green tire or an intermediate assembly body for green tire and angular levers, said angular levers being connected together by means of linking members combined together through pins so as to form a number of parallelogram links of mutually cooperative movement and at least a driving means being provided for swinging said angular levers.

1 Claim, 3 Drawing Figures

APPARATUS FOR PRODUCT TRANSPORTATION IN TIRE-FORMING MACHINE

The present invention relates to an apparatus for transporting green tire manufactured by a tire-forming machine or an intermediate assembly body for green tire to be manufactured by the tire-forming machine.

For transporting green tire or an intermediate assembly body for the manufacture of green tire, there are provided various means such as (1) a plurality of circular plates formed with a large number of cam grooves which are engaged by pins attached to product-holding members so that said circular plates can be rotated in a relative manner thereby causing the holding members to extend or retract in radial direction, (2) the use of a hollow circular ring-shape rubber bag or (3) the rotating movements of such circular plates is converted to movements in radial direction by gearing means.

In cases where cam grooves are utilized, the range of correspondence to a change in size of the product to be transported may be comparatively wide but because of such cam grooves and pins in line contact, there occurs a serious problem such as serious wear of the cam grooves, and in the case of use of a hollow circular ring-shape rubber bag, the range of correspondence to a change in size of the product to be transported is comparatively narrow and besides, such rubber bag tends to become deflected depending on the weight of the tire for transportation, thus affecting the quality of the tire.

In order to eliminate these drawbacks, there is provided such means as has rings to control the extension and retraction of product-holding members in a mechanical manner, but still in this case, there occurs the problem of having to replace such rings from time to time in view of a change in size of the product for transportation.

On the other hand, when gearing means is employed, transporting means itself cannot but become bulky in size in radial direction so that a dead space will also become too large due to the movement of the apparatus, thus requiring the center of the tire-forming drum to be positioned high until its operative efficiency is worsened and the operation becomes costly. So all the aforesaid means are considered unsatisfactory in many respects so that many attempts to improve them have heretofore been made.

With the view of improving all the aforesaid points, the present invention has thus been offered.

Namely, in a transport apparatus of a tire-forming machine for transporting green tire or an intermediate assembly body for green tire, there are provided a pair of circular plates attached to transfer means capable of moving in the axial direction of the tire-forming drum, and a plurality of rotatable shafts are provided at substancially equal intervals in the circumferential direction of said circular plates and positioned on a circle concentric with said circular plates. These shafts are fitted with levers having holding members for green tire or an intermediate assembly body for green tire and angular levers, said angular levers themselves being connected together by means of linking members mutually combined through pins, so as to form a number of parallelogram links of mutually cooperative movement, and at least a driving means being provided for swinging said angular levers, all of which are apparently characteristic of the present invention.

Thus the object of the present invention is to provide an apparatus for transporting tires in a tire-forming machine, which is well qualified to resolve all the aforesaid defects inherent in conventional apparatus.

Since the present invention has the aforesaid structure, already explained in detail hereinbefore, the angular levers can be swung by driving means whereby all the shafts are rotated through parallelogram links, and by swinging the levers attached to said shafts, it is possible to extend or contract (open or retract) synchronously in radial direction, thereby permitting the holding or release of green tire or an intermediate assembly body for green tire.

At the same time, corresponding to a change in size of the product or tire, it is rendered possible to suitably select the length and angle of the levers fitted with holding members so that a fairly wide range of such correspondence can be ensured without replacing any parts. Also, on account of surface contact among the shafts, pins, levers, links and circular plates, they do not wear out easily and keeps a large possibility of lasting maintenance and moreover, it is also possible to reduce the largest external configuration of said transport apparatus to a possible minimum in order to put up with a small dead space due to the movement of the apparatus, thus contributing to an appreciable cost-down of the operation, thanks to the simplification of the structural parts of the present invention.

Other objects and characteristics of the invention will be made clear in further detail by the following statement with reference to the accompanying drawings in which.

Figure 1:
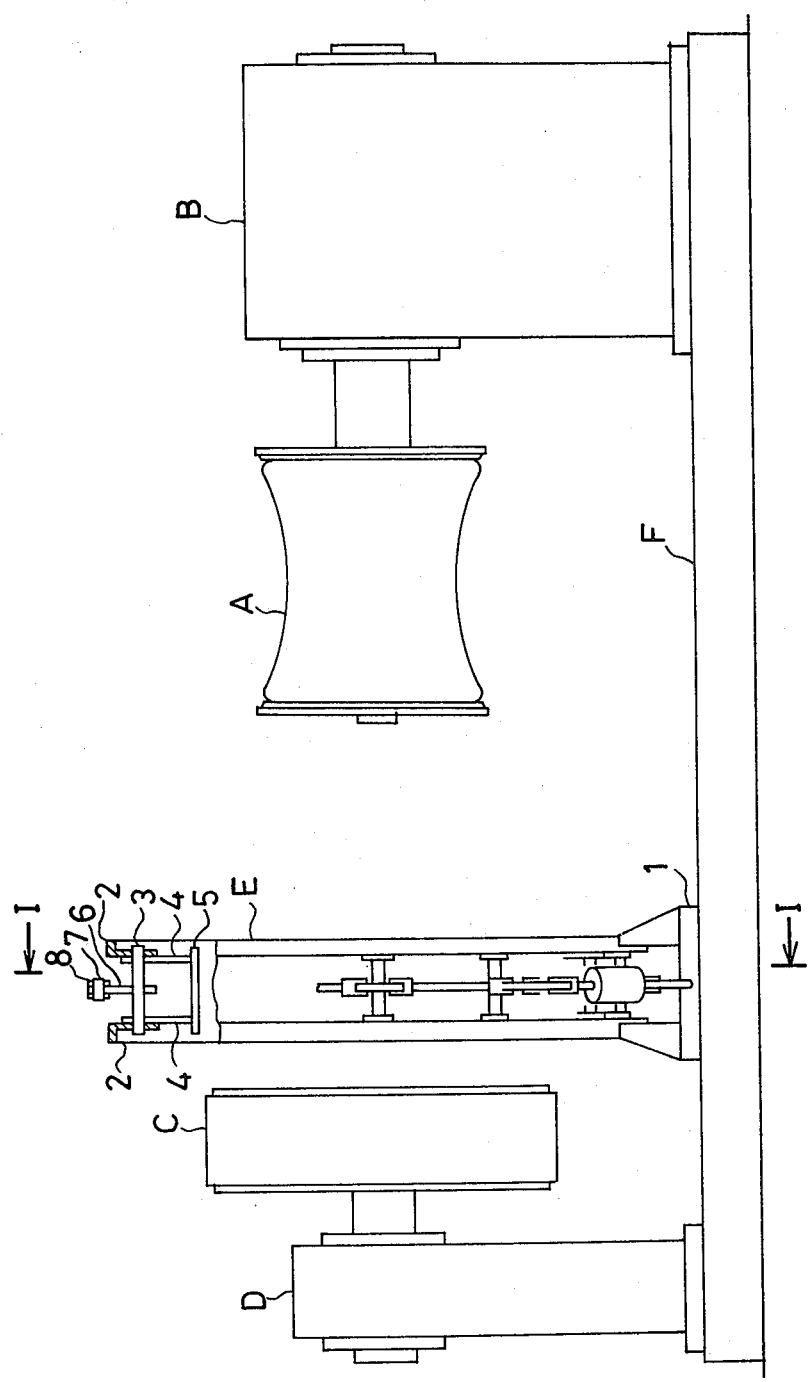
FIG. 1 is a front view of a radial tire forming apparatus broken in part showing a preferred embodiment of the present invention.
Figure 2:
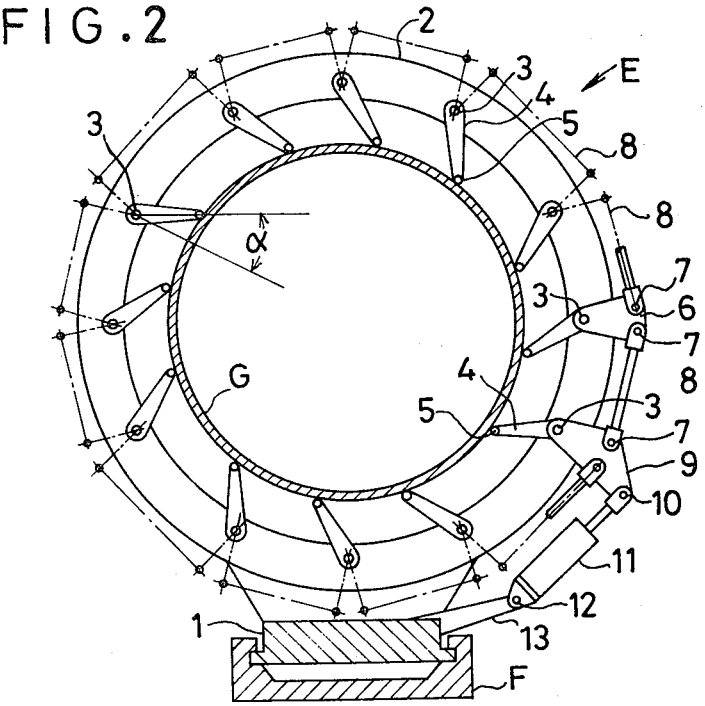
FIG. 2 is a cross-sectional view taken along the line I—I of FIG. 1.

In FIGS. 1 and 2, A designates a second-stage forming drum, B designates a headstock adapted to support the drum A in a rotatable manner and housing means for driving the drum A, C designates a belt drum for assembling a belt ply and tread in cylindrical form, D designates a stand capable of supporting the drum C in a rotatable manner and housing means for driving the drum C, E designates means for transporting green tire formed by the drum A or an intermediate assembly for green tire assembled by the drum C, and F designates a common base for conducting the movement of the driving means E in the axial direction of the drum.

While the second-stage forming apparatus should have attachments such as a stitcher, ply servicer, means for moving the transport means and control means, they are not shown in the drawings.

As shown in FIGS. 1 and 2, the transport means E consists of a pair of ring-shape circular plates 2 secured to a carriage 1 adapted to be guided on the common base F and to move in the axial direction of the drum, a plurality of rotatable shafts 3 on the circular plates 2 at equal intervals in the circumferential direction and positioned on a circle concentric with the circular plates 2, levers 4 attached to all the shafts 3 at the same angle $\alpha$ against a plane including the axial core of the drum and the center of the shafts 3, members 5 attached to the top ends of the levers 4 for holding the product to be transported, a triangular lever 9 attached to one of the shafts 3, a triangular lever 6 attached to the other shaft 3, a link 8 for mutually connecting the adjacent triangular levers 6 and 9 through pins 7 and a fluid-pressure cylinder 11 disposed between the triangular lever 9 and the lever 13 secured to the carriage 1 through pins 10 and 12. In this manner, there is constituted a parallelogram link mechanism by said link 8, triangular levers 6 and 9 and the circular plate 2 so as to connectively move around the support points of the pins 7 and the shaft 3.

FIG. 2 shows a condition in which the intermediate assembly body G for a tire is held. In this instance, while the holding member 5 is shown in the form of a round bar, it may be suitably changed in shape, depending on the kind of product to be transported and at the same time, a magnet can be incorporated therein, as the case may require.

At the same time, while the fluid-pressure cylinder 11 is used as driving means, it may be replaced by rotary driving means such as a motor, as incorporated therein.

In the aforesaid preferred embodiment, the cylinder 11 is actuated so that the triangular lever 9 can swing around the shaft 3 as the center until each shaft 3 is rotated through said parallelogram link mechanism and each lever 4 is swung for the same angle around the shaft 3 as the center, and the product-holding member 5 can be extended or retracted synchronously in radial direction. In this way, the product-holding member 5 serves to catch or release the intermediate assembly body G or the green tire formed by the drum A. Thus, it becomes possible to transport the aforesaid product by means of movement of the carriage 1.

The preferred embodiment shown in FIG. 3 will be explained hereinafter.

In this preferred embodiment, shafts 3a and 3b are alternately provided on the circular plates 2, levers 4 having each holding member 5 are attached to the shafts 3a and 3b, a triangular lever 9a is attached to the other shafts 3a, a triangular lever 6a to the other shaft 3a and a triangular lever 6b to the shaft 3b respectively, the adjacent levers 6a and 9a are connected together by means of a link 8a through pins 7a on one hand and on the other hand, the triangular levers 6b themselves are connected together by means of a link 8b through pins 7b thereby to form two sets of parallelogram links of mutually cooperative movement, namely, the link 8a, triangular levers 6a and 9a and the circular plate 2 are combined to form a set of parallelogram link mechanism having the pins 7a and the shafts 3a as support points, and the link 8b, triangular levers 6b and the circular plate 2 are combined together to form another set of parallelogram link mechanism having the pins 7b and the shafts 3b as support points. These two sets of parallelogram link mechanism are combined together by means of a lever 14 secured to one of the shafts 3b, a lever 17 secured to one of shafts 3a and a link 16 adapted to connect the levers 14 and 17 through pins 15.

On the other hand, the fluid-pressure cylinder 11 is already connected to the triangular lever 9a whereby said two sets of parallelogram link mechanism are actuated at one time so that, in the same manner as the aforesaid first preferred embodiment, a plurality of product-holding members 4 can be extended or contracted (opened or closed) synchronously in radial direction.

According to the aforesaid preferred embodiments, the product-holding members are so designed as to be actuated by said linking mechanism and since the shafts, pins, levers, links and circular plate are all in mutual surface contact so that there is little wear among them and high accuracy can be maintained over a long period of time.

At the same time, by suitably selecting the length and angle of the levers having product-holding members, it is possible to make all such assembly compatible with changes in size of products to be transported within a fairly large range, without exchanging the parts. Also, since the largest external configuration of all assembly complies with the end of the triangular levers, it is permitted to make the triangular levers small in size so that all the assembly can be provided in compact form because of which it becomes possible to provide a dead space consequential to the movement of the present apparatus.

Figure 3:
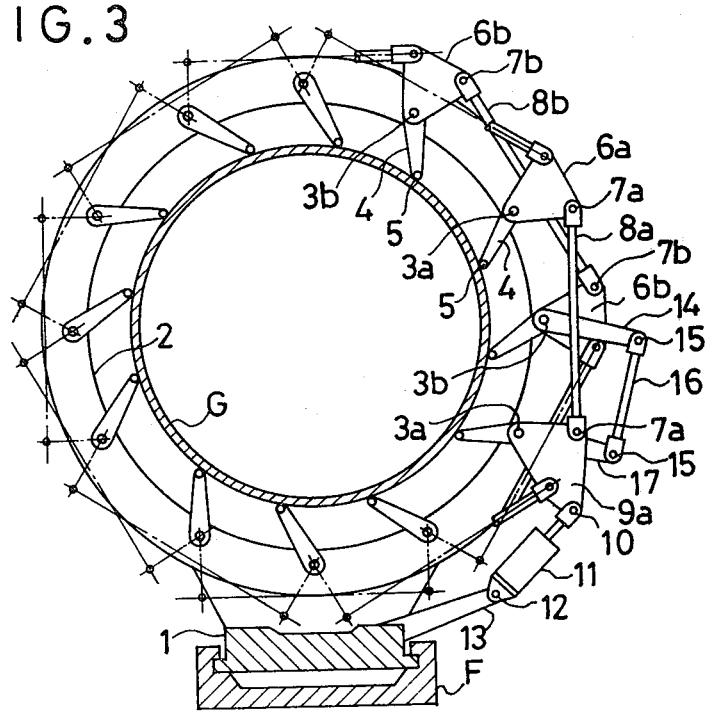
FIG. 3 is a corresponding cross-sectional view taken along the line I—I of FIG. 1 showing another preferred embodiment of the invention.

Particularly in the case of the preferred embodiment shown in FIG. 3, it is possible to increase the number of the product-holding members without the increase in a dead space thereby enabling the product-holding members to facilitate stabilized holding.

What is claimed is:

1. A tire forming machine mounted on a base and including thereon a forming drum and a transport apparatus for transporting green tire or an intermediate assembly body for green tire, the transfer apparatus including transfer means for holding said green tire or body and movable in the axial direction of the forming drum, a pair of circular plates which are parallel to each other and attached to said transfer means, a plurality of shafts rotatably mounted on said circular plates at substantially equal intervals in the circumferential direction and positioned on a circle concentric with the circle of said circular plates, levers fixed on said shafts to pivot therewith, product-holding means connected to said levers for holding said green tire or body, an angular lever fixed to each of said shafts and pivotable therewith, link members connecting said angular levers in pairs, said angular levers and said link members being mutually combined to form a number of parallelogram links having mutually cooperatuve movement, and at least one driving means for swinging said angular levers to thereby open and close said product holding means upon said green tire or body.

* * * * *